(12) United States Patent
Immink et al.

(10) Patent No.: US 7,046,177 B2
(45) Date of Patent: May 16, 2006

(54) SERVO SYSTEM, APPARATUS COMPRISING A SERVO SYSTEM, SIGMA DELTA MODULATOR, AND INTEGRATED CIRCUIT COMPRISING A SIGMA DELTA MODULATOR

(75) Inventors: Albert Hendrik Jan Immink, Eindhoven (NL); Johannes Aldegonda Theodora Maria Van Den Homberg, Eindhoven (NL); Aalbert Stek, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 10/544,199

(22) PCT Filed: Feb. 6, 2004

(86) PCT No.: PCT/IB2004/050082

§ 371 (c)(1),
(2), (4) Date: Aug. 2, 2005

(87) PCT Pub. No.: WO2004/070951

PCT Pub. Date: Aug. 19, 2004

(65) Prior Publication Data

US 2006/0077075 A1   Apr. 13, 2006

(30) Foreign Application Priority Data

Feb. 6, 2003   (EP)   ................... 03100250

(51) Int. Cl.
*H03M 1/48*   (2006.01)
(52) U.S. Cl. .................. 341/117; 341/143; 341/142
(58) Field of Classification Search ........ 341/142–143, 341/111–117
See application file for complete search history.

(56) References Cited

U.S. PATENT DOCUMENTS

| | | | | |
|---|---|---|---|---|
| 3,662,379 A | * | 5/1972 | Miller et al. ................. | 341/117 |
| 4,511,884 A | * | 4/1985 | Serev et al. ................. | 341/116 |
| 6,426,712 B1 | * | 7/2002 | Hare et al. ................... | 341/116 |
| 6,741,199 B1 | * | 5/2004 | Gartner et al. .............. | 341/111 |
| 6,744,230 B1 | * | 6/2004 | Hill et al. .................... | 318/254 |

FOREIGN PATENT DOCUMENTS

EP   0 501 570 A1   9/1992

\* cited by examiner

*Primary Examiner*—Rexford Barnie
*Assistant Examiner*—Lam T. Mai

(57) ABSTRACT

A servo system comprising an analog sigma delta modulator for generating a normalized digital error correction signal from first and second analog control signals. The sigma delta modulator comprises an analog low-pass filter, a quantizer delivering the digital error correction signal and a multiplying DA-converter in feedback arrangement between the output of the quantizer and the input of the low-pass filter for multiplying the feedback signals with the sum of the analog control signals.

14 Claims, 2 Drawing Sheets

Figure 1:
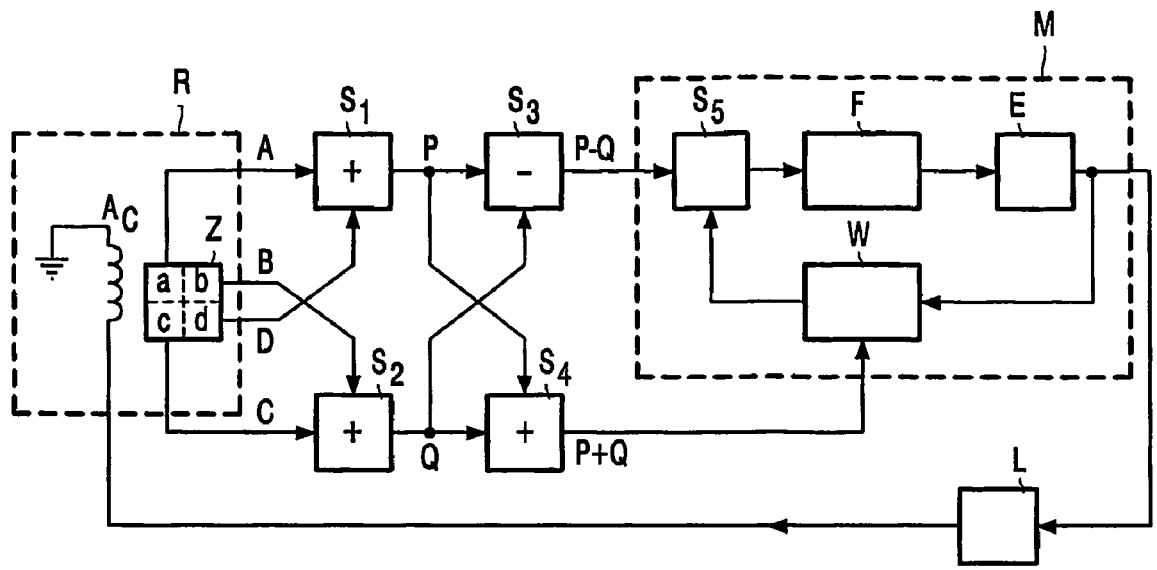

SERVO SYSTEM, APPARATUS COMPRISING A SERVO SYSTEM, SIGMA DELTA MODULATOR, AND INTEGRATED CIRCUIT COMPRISING A SIGMA DELTA MODULATOR

The invention relates to a servo system for generating a normalized digital actuator-signal from first and second control signals, said servo system comprising a sigma delta modulator for generating a digital representation of the quotient between the difference and the sum of the two control signals. Furthermore the invention relates to an apparatus comprising a servo system, a sigma delta modulator, and an integrated circuit comprising a sigma delta modulator.

Such a servo system is known from applicant's prior European patent application publication 0 501 570. Servo systems often generate an actuator signal from the difference (P–Q) of two control signals P and Q. Sensors generate the two control signals and the purpose of the servo system is to control an actuator into the position wherein the sensors produce equal control signals. In this position the difference signal is zero while it is negative at one side of this position and positive at the other side of this position. However, in many servo systems the amplitude of the control signals is not only dependent on the error to be corrected but also on other, desired or undesired, parameters. For instance, in optical recording, the control signals P and Q are derived from signals generated by several segments of a photodiode and the amplitude of these signals is proportional to the output power of the laser and the reflection of the optical disc. Therefore, the signals are modulated by the information on the disc. Furthermore disc reflection variation across the surface of the disc and, more important, across different disc manufacturers must be compensated for. This is done by normalizing the control signals, i.e. by dividing the control signals or the difference between the control signals, by the sum of these control signals.

The general form of the normalization is given by (P–Q)/(P+Q). The control signals P and Q themselves may be derived from different combinations of the photodiode-segment signals, dependent on which parameter has to be controlled e.g. focus, tracking etc. The division of the difference signal P–Q by the sum signal P+Q is often implemented by using a so-called Gilbert cell. This implementation makes use of the fact that there exists an exponential relation between the collector current and the base-emitter voltage of bipolar transistors. However, presently there is a trend to minimize the number of ICs and therefore to move the normalization function into a CMOS IC (Complementary Metal-Oxide-Semiconductor Integrated Circuit). In such ICs the MOS-transistors have a square or substantially square characteristic of drain current versus gate-source voltage, so that the Gilbert topology cannot be used. European patent application publication referenced above shows a solution that allows the use of MOS transistors for dividing the difference signal P–Q by the sum signal P+Q. Herein a digital sigma-delta modulator is used with a digital low-pass filter followed by a quantizer whose output is fed back to the input of the low-pass filter. This solution consists in having a digital multiplier in the feedback path between the output of the quantizer and the input of the low-pass filter of the sigma-delta modulator, while the digital sum signal is used as the multiplication factor for the digital multiplier. It can be shown that with this arrangement the quantizer output is a digital signal whose value is substantially equal to the ratio of the input value to the sigma-delta modulator and the input value to the feedback multiplier.

It is an object of the present invention to use the same principle as is used in the aforementioned prior art document but with substantially reduced circuit components and/or chip area (integrated circuit area). To this end the servo system of the present invention is therefore characterized in that the sigma-delta-modulator is an analog sigma-delta-modulator having an analog low-pass filter, a quantizer arranged for receiving an output signal of the analog low-pass filter, a multiplying DA-converter for converting and multiplying an output signal of the quantizer by the sum of the first and second control signals and means for supplying the difference of the first and second control signals and the output signal of the multiplying DA-converter to an input of the analog low-pass filter.

In the servo system of the prior art document the digital sigma-delta modulator has only one function, namely the normalization of the error correction signal, whereas the digitization of the signals is performed prior to the sigma-delta modulator in multi-bit AD-converters. In contradistinction thereto in the servo system of the present invention the analog control signals are both normalized and digitized in the same analog sigma-delta modulator so that preceding analog to digital converters are economized.

The quantizer of the analog sigma-delta modulator produces digital words of a certain bit-length and of a certain sample rate. The words of the quantizer are used in the multiplying DA converter. Herein each of the bits of the digital word switches a current that has to be proportional to the "significance" of the respective bit and to the multiplication factor, in this case the sum of the first and second control signals. A very simple implementation is obtained when the servo system of the present invention is further characterized in that the multiplying DA-converter comprises a 1 bit quantizer and a current source supplying the sum of the first and second control signals and switch means controlled by the output signals of the quantizer for switching said current source to the input of the low-pass filter. In this case the quantizer is a simple comparator comparing the output of the low-pass filter with a DC reference level. The multiplying DAC is just one single current source representing the sum (P+Q) of the two control signals that is switched on and off depending on the output of the comparator.

In the servo system of the present invention the difference (P–Q) between the two analog control-signals is applied to the input of the analog low-pass filter. In CMOS it may be difficult to carry out such subtraction operation. To facilitate this operation the servo system of the present invention may be further characterized in that the analog low-pass filter is a differential analog low-pass filter having a first and a second input terminal to which the first and second control signals respectively are applied. Preferably a current source supplying a control current $i_p$ is connected to one of the inputs of the differential low-pass filter and a current source supplying a control current $i_q$ is connected to the other input terminal of the differential low-pass filter.

The most efficient and convenient implementation of the analog low-pass filter is a first order differential integrator. However, with such kind of low-pass filter the DC impedance at he input terminals is extremely high. When this low-pass filter is driven with current sources, the result is an arrangement in which the DC level at the input terminals is completely floating. This may be overcome when, according to another aspect of the invention, the servo system is characterized by a common mode control circuit for stabilizing the common mode voltage at the input of the differential analog low-pass filter.

With the above-described arrangement the derivation of the sum signal from the two control signals requires good care to prevent DC-offset and gain mismatch to occur. For instance when a DC-offset occurs in the sum signal this will result in an error in the normalization, so that the error correction signal generated by the arrangement becomes dependent on equal amplitude variations of the control signals. Also a gain mismatch may occur in the sum signal, which results in a change in the overall loop gain of the servo system. It is a still further object of the invention to avoid these problems and therefore the servo system of the present invention is further characterized in that the common mode control circuit is an operational transconductance amplifier (OTA) which receives at its input the mean voltage of the two input terminals of the analog low-pass filter and a reference voltage and whose output constitutes said current source supplying the sum of the first and second control signals. Said mean voltage may e.g. be easily derived from the interconnection of two serially connected equal resistances between the input terminals of the filter. By the feedback loop the output current of the OTA is then equal to the sum of the control currents that are applied to the input of the low-pass filter, so that the above-mentioned errors (offset and gain) are automatically avoided. In this sigma delta modulator the sum signal is not applied as a separate input signal but is automatically generated in the sigma delta modulator itself.

When the analog low-pass filter is implemented by a differential integrator, the problem may arise that, even with a common mode control circuit at the input terminals of the filter, the output of this filter, which is connected to the input of the quantizer, is still floating, so that the operation of the quantizer becomes unpredictable. To avoid this the servo system according to the present invention may preferably be characterized in that the analog low-pass filter comprises first and second single-ended integrators for integrating the first and second control signals respectively and an operational transconductance amplifier (OTA) which receives at its input the mean voltage of the two output terminals of the analog low-pass filter and a reference voltage and whose output constitutes said current source supplying the sum of the first and second control signals. Again said mean voltage may be derived from the interconnection of two serially connected equal resistances, in this case between the output terminals of the filter.

Figure 2:
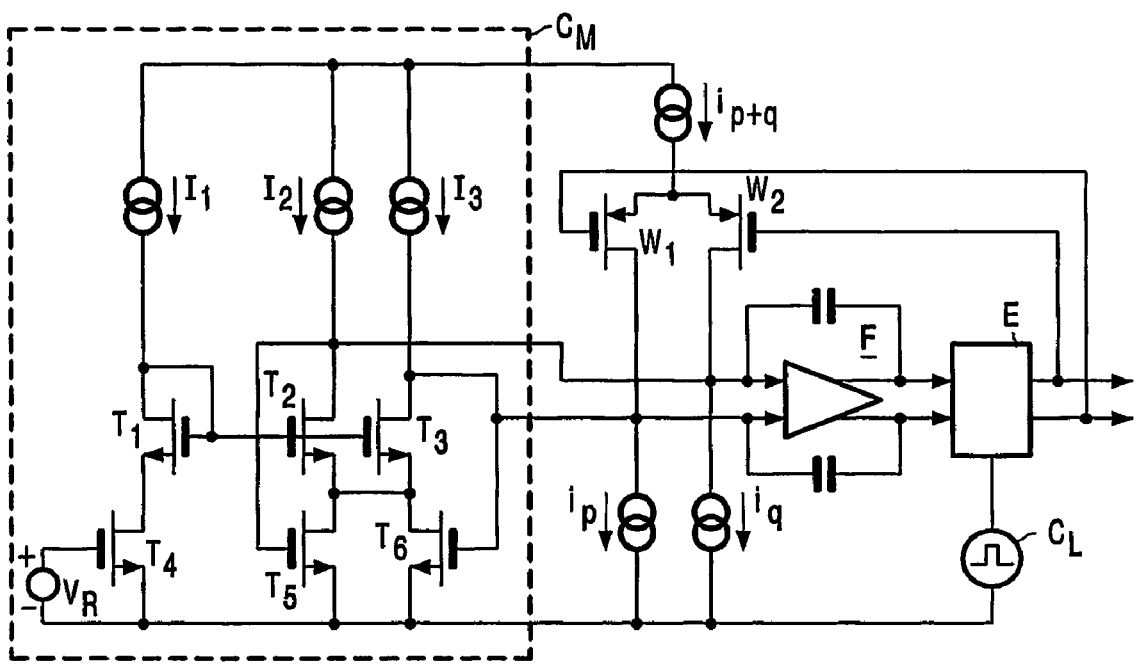
Figure 3:
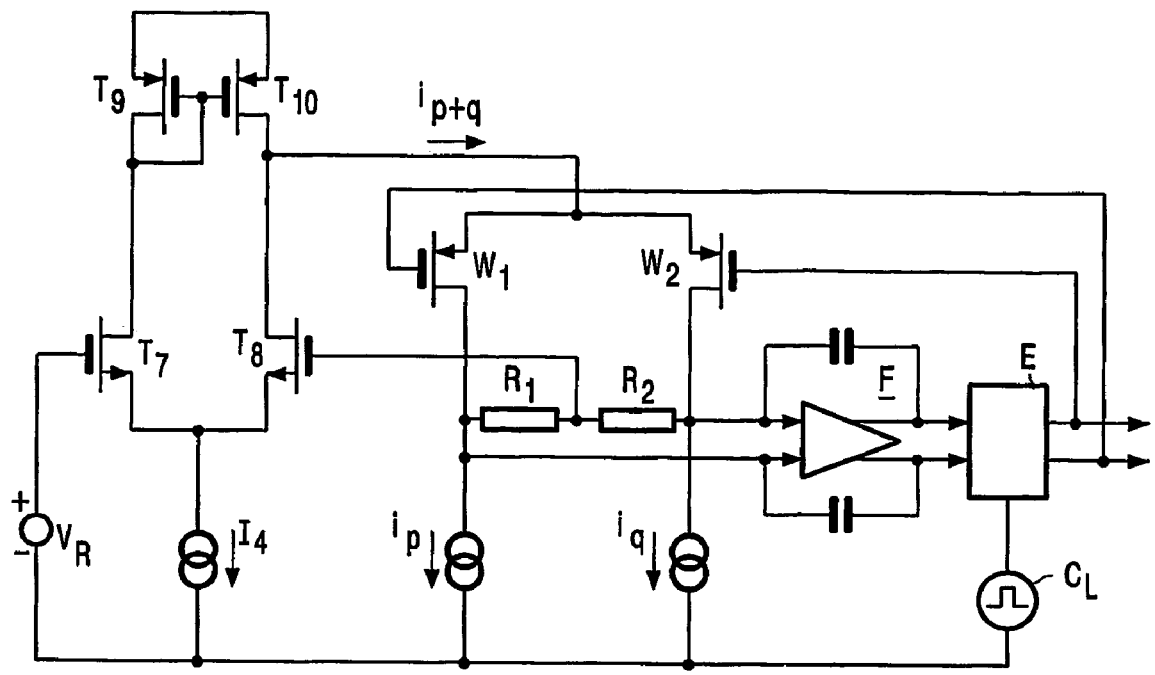
Figure 4:
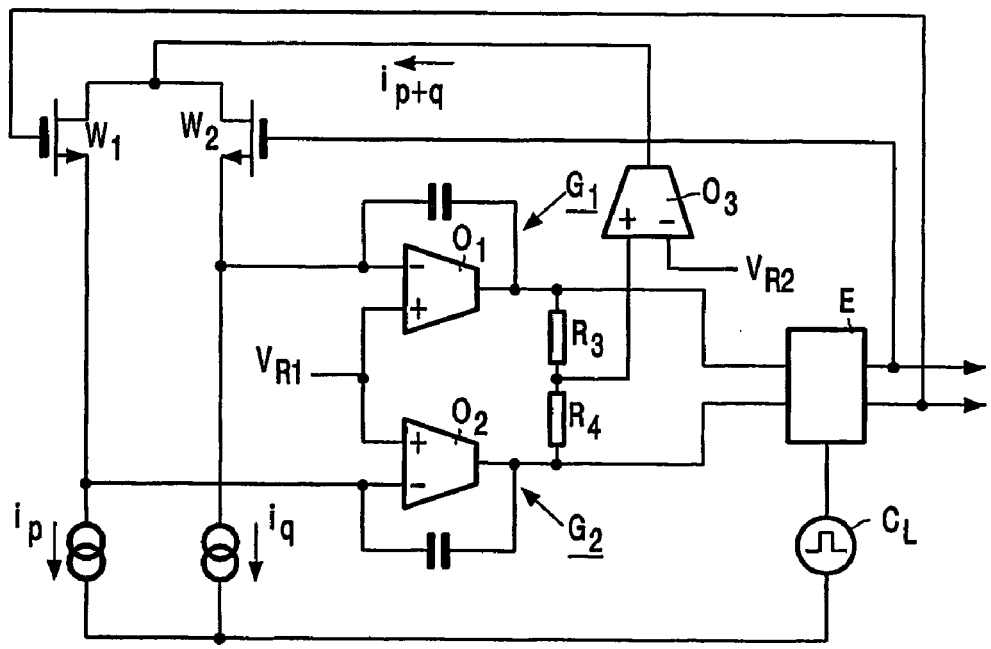

The invention will be described with reference to the accompanying figures. Herein shows:

FIG. 1 a servo system according to the invention,

FIG. 2 a first embodiment of a sigma delta modulator according to the invention, FIG. 3 a second embodiment of a sigma delta modulator according to the invention and FIG. 4 a third embodiment of a sigma delta modulator according to the invention.

FIG. 1 shows a servo system for use in apparatus for optical recording on and/or reproduction from an optical disc. A block R schematically shows the optical system of such apparatus. Particulars of such optical system may be found e.g. in applicant's European patent application publication 0501570 FIG. 9 or in "The Compact Disc Handbook" by Ken C. Pohlmann, ISBN 0-89579-300-8, chapter 4. Both publications are incorporated herein by reference.

The optical system R usually comprises at least one photodiode that receives a light beam reflected from the optical disc and that operates as sensor for the servo system. In the system of FIG. 1 one beam is used that is sent to the disc (not shown) and the reflected beam is sensored by a four-segment photodiode Z. The four segments of the diode Z are denoted by a, b, c and d and they generate signals A, B, C and D respectively. Because the amount of light received by the segments of the photodiode is dependent on the focusing of the beam on the disc and on the tracking of the beam along the tracks of the disc, the signals generated by the photodiode can be used to control the focusing and the tracking.

An adder $S_1$ generates a control signal P from the segment signals according to the formula $P=A+D$ and an adder $S_2$ generates a control signal Q according to the formula $Q=B+C$. With the control signals P and Q so composed, the difference signal P−Q could be used to control the focusing of the laser-beam on the optical disc according to the method known as "astigmatic focus error signal generation". However, as explained in the introductory part of this description, it is of primary importance that the error correction signal be normalized to cope with the undesired variations of the control signals P and Q. Therefore, the difference signal P−Q has to be divided by the sum signal P+Q to obtain a normalized error correction signal (P−Q)/(P+Q) for correcting the focus of the laser beam.

It may be noted that the same expression (P−Q)/(P+Q) represents a suitable and properly normalized error correction signal for other parameters of the optical system, provided that the control signals P and Q are accordingly composed from the segment signals A, B, C and D. For instance, when $P=A+B$ and $Q=C+D$ the normalized error correction signal (P−Q)/(P+Q) is suitable for guiding the laser beam along the tracks of the optical disc according to the method that is known as "push pull following".

In the arrangement of FIG. 1 the difference signal P−Q is derived in a subtractor $S_3$ and the sum signal P+Q is derived in an adder $S_4$. The difference signal P−Q from the subtractor $S_3$ is applied as input signal to an analog sigma delta modulator M. This analog sigma delta modulator comprises a subtractor $S_5$, an analog low-pass filter (loop filter) F for low-pass filtering the output of the subtractor $S_5$, a one bit quantizer (comparator) E for comparing the output of the loop filter F with a reference voltage and for delivering e.g. a "one" when the output of the loop filter is higher than the reference voltage and a "zero" when this output is lower than the reference voltage and, finally, a multiplying AD converter that multiplies the output pulses of the comparator E with the sum signal P+Q of the adder $S_4$. The result of this multiplication is subtracted from the difference signal P−Q in the subtractor $S_5$. In operation: when the low frequency amplification of loop filter F and comparator E is sufficiently high, the feedback loop of the sigma delta modulator makes the low frequency content at the input of the loop filter nearly zero. This means that the two inputs of the subtractor are substantially equal as far as their low frequency contents are concerned. Therefore, the output of the comparator multiplied by the gain factor (P+Q) of the AD converter W equals the input signal (P−Q) or the output signal equals the input signal (P−Q) divided by the sum signal (P+Q). The result at the output O of the analog sigma delta modulator is a one bit digital signal, whose low frequency content is equal to (P−Q)/(P+Q) that can eventually be applied directly or through a suitable analog low-pass filter L to an actuator $A_c$ in the optical system R, for carrying out the required correction. Instead of using the output of the sigma delta modulator to directly drive the actuator Ac, this output may be applied to a decimating filter (not shown) for transforming the error correction signal into a multi bit digital signal that allows the application of various digital signal-processing functions, such as flexible filtering and security measures. The digital error correction signal is subsequently converted into an analog signal for application to the actuator.

FIG. 2 shows an implementation of the sigma delta modulator M with the P–Q subtractor $S_3$ integrated therein. Because currents can easily be added by connecting the sources together, the control signals P and Q and the sum signal P+Q of FIG. 1 are applied in the form of currents from current sources $i_p$, $i_q$ and $i_{p+q}$. Because in CMOS it may be difficult to make subtractions, the loop filter F and the comparator E are of differential nature. A subtraction can now be implemented by simply connecting the current to be subtracted to the other input terminal of the loop filter. So the current source $i_p$ is connected to one of the input terminals of the loop filter and the current source $i_q$ is connected to the other input terminal. The quantizer (comparator) E is clocked with pulses from a clock-pulse generator $C_1$, which ensures that the quantizations are made at fixed intervals. The multiplying AD converter comprises of a simple differential switch comprising two PMOS transistors $W_1$ and $W_2$ whose source electrodes are connected together to the current source $i_{p+q}$ and whose gate electrodes are connected to the differential output of the comparator E. The drain electrodes of the PMOS transistors $W_1$ and $W_2$ are connected to the input terminals of the loop filter F. It may be observed that in this implementation the two filter input terminals serve as both the subtractor $S_3$ and the subtractor $S_5$ of FIG. 1. In FIG. 2 a first order low-pass filter is shown but this filter can be made of higher order, which will increase the resolution of the analog to digital conversion of the arrangement.

In FIG. 2 the loop filter is a differential integrator. The input terminals thereof are completely floating, so that a slight offset in the currents $i_p$, $i_q$ or $i_{p+q}$ will lead to a drift of the input common mode voltage. To prevent this the sigma delta modulator of FIG. 2 comprises a common mode control circuit $C_m$. This circuit contains three NMOS cascodes $T_1$–$T_4$, $T_2$–$T_5$, and $T_3$–$T_6$. Each of the upper transistors has a DC current source $I_1$, $I_2$, $I_3$ connected to the respective drain electrode, while the source electrode of each upper transistor is connected to the drain electrode of the corresponding lower transistor and the drain electrodes of $T_5$ and $T_6$ are interconnected. The gate electrodes of the three upper transistors are connected to the drain electrode of transistor $T_1$. The gate electrode of transistor $T_4$ is connected to a reference voltage, the gate electrode of transistor $T_5$ is connected to the drain electrode of transistor $T_2$ and to one of the input terminals of the loop filter and the gate electrode of transistor $T_6$ is connected to the drain electrode of transistor $T_3$ and to the other input terminal of the loop filter. The currents of the current sources $I_1$, $I_2$ and $I_3$ are preferably equal. The same holds for the three upper transistors and also for the three lower transistors. The three lower transistors have such low drain voltages that they work in their linear range. Therefore, they serve as controlled source resistors for the upper transistors. When the voltages at the two filter input terminals equally increase, the transistors $T_5$ and $T_6$ will show a lower resistance in comparison to $T_4$. A higher current will flow through $T_2$ and $T_3$ and this will restore the nominal situation. Consequently, the common mode control circuit shows low impedance to common mode voltage changes at the filter input terminals. A differential voltage at these terminals will increase the current in one of the transistors $T_5$, $T_6$ but decrease the current equally in the other transistor, so that the common mode control circuit shows high resistance to differential voltages.

In FIG. 1 the adder $S_4$ is arranged to make the sum signal P+Q out of the two control signals P and Q. Similarly, in FIG. 2 the current $i_{p+q}$ has to be made out of the two control currents $i_p$ and $i_q$. This operation may cause errors such as DC offset or gain mismatch with the result that either the normalization will be disturbed or the loop gain of the servo system will be affected. In the implementation of FIG. 3, in which elements corresponding with those of FIG. 2 have the same references, the addition of the control currents $i_p$ and $i_q$ to $i_{p+q}$ may be carried out without substantial errors while, moreover, the common mode control circuit $C_m$ of FIG. 2 can be dispensed with. To this end the arrangement of FIG. 3 comprises an operational transconductance amplifier (OTA) with a differential amplifier of two PMOS transistors $T_7$, $T_8$, a common current source $I_4$ delivering current to the source electrodes of the two transistors and a current mirror of two NMOS transistors $T_9$, $T_{10}$ for mirroring the drain current of PMOS transistor $T_7$. Furthermore, two equal resistors $R_1$ and $R_2$ are connected in series between the input terminals of the differential loop filter F and the connection point of these resistors is connected to the gate electrode of $T_8$ while the gate electrode of $T_7$ is connected to a reference voltage $V_r$. The interconnected drain electrodes of the transistors $T_9$ and $T_{10}$ constitute the output of the OTA and this output is connected to the two source electrodes of the differential switch transistors $W_1$ and $W_2$. In operation: because of the equality of the resistors $R_1$ and $R_2$ the interconnection of these resistors has the common mode voltage of the two filter input terminals. The feedback loop of the OTA through the current mirror transistors $T_8$, $T_{10}$ and the differential switch transistors $W_1$, $W_2$, maintains this interconnection at the reference voltage $V_r$ of the gate electrode of transistor $T_7$. Therefore the OTA prevents floating common mode voltages at the filter input terminals and therefore the unit $C_m$ of FIG. 2 has become superfluous. What is more: the current supplied by the OTA to the interconnected source electrodes of the differential switch transistors $W_1$ and $W_2$ is equal to the sum of the two control currents $i_p$ and $i_q$, provided that the resistors $R_1$ and $R_2$ are sufficiently equal and of sufficiently high value. Then any offset and gain mismatch errors in the generation of the sum current $i_{p+q}$ are avoided.

Capacitive feed through of the switching signals from the comparator in the switches $W_1$ and $W_2$ may occur. The resulting charge injection at the input of the filter F leads to inaccurate normalization especially for small input currents $i_p$ and $i_q$. The problem may be overcome by dummy transistors (capacitors) that are connected with shorted drain and source between the gate electrode of each of the transistors $W_1$, $W_2$ and the drain electrode of the other of these transistors. The same measure may be taken in the arrangements of FIGS. 2 and 4.

When the differential loop filter F is an integrator the output terminals thereof are for DC completely separated from the input terminals by the feedback capacitors. When, moreover, the clocked comparator E does not clamp the common mode voltage at its input terminals, this voltage is completely floating. Consequently an additional common mode loop to control the output of the loop filter is needed. However, the problem can be solved in the manner depicted in FIG. 4. In this Figure circuit elements that correspond with circuit elements of FIG. 3 have the same reference numerals.

The differential integrator F of FIG. 3 is now replaced by two single ended integrators $G_1$ and $G_2$, each comprising an operational transconductance amplifier (OTA) $O_1$ and $O_2$ respectively and an integrating capacitor between the output and the inverting input of the OTA. These inverting inputs are also connected to the control current sources $i_p$ and $i_q$ while the non-inverting inputs of the two OTAs are connected to a reference voltage $V_{r1}$. A third operational transconductance amplifier $O_3$ has its non-inverting input connected to the interconnection of two equal resistors $R_3$ and $R_4$, which are serially coupled between the outputs of the two OTAs $O_1$ and $O_2$. The inverting input of $O_3$ receives a reference voltage $V_{r2}$ and the output of this OTA delivers the current $i_{p+q}$ to the source electrodes of the differential switch transistors $W_1$ and $W_2$. The single loop through $O_1$, $O_2$, resistors $R_1$, $R_2$, the OTA $O_3$ and the differential switch $W_1$, $W_2$ keeps the common mode voltage of the input terminals of $O_1$ and $O_2$ at the reference potential $V_{r1}$ and of the output terminals of $O_1$ and $O_2$ at the reference potential $V_{r2}$. The resistors $R_3$ and $R_4$ may be connected to the output terminals of OTAs $O_1$ and $O_2$ through buffer stages (not shown) to prevent that too high value resistors have to be used. The same measure may be taken for the connection of the resistors $R_1$ and $R_2$ to the input terminals of the differential filter F in FIG. 3.

The invention claimed is:

1. A servo system for generating a normalized digital actuator-signal from a first and control signal (P) and a second control signal (Q), said servo system comprising a sigma delta modulator for generating a digital representation of a quotient (P−Q)/(P+Q) between a difference (P−Q) and a sum of the two control signals (P+Q), characterized in that the sigma-delta-modulator is an analog sigma-delta-modulator (M) having an analog low-pass filter (F), a quantizer (E) arranged for receiving an output signal of the analog low-pass filter, a multiplying DA-converter (W) for converting and multiplying an output signal of the quantizer by the sum (P+Q) of the first and second control signals and means for supplying the difference (P−Q) of the first and second control signals and the output signal of the multiplying DA-converter (W) to an input of the analog low-pass filter (F).

2. A servo system as claimed in claim 1, characterized by a 1 bit quantizer (E) and in that the multiplying DA-converter (W) comprises a current source ($i_{p+q}$) for supplying the sum of the first and second control signals and switch means ($W_1$, $W_2$) controlled by the output signals of the quantizer for switching said current source to the input of the low-pass filter (F).

3. A servo system as claimed in claim 2, characterized in that the analog low-pass filter (F) is a differential analog low-pass filter having a first and a second input terminal to which the first and second control signals ($i_p$, $i_q$) respectively are applied.

4. A servo system as claimed in claim 3, characterized by a common mode control circuit ($C_m$) for stabilizing the common mode voltage at the input of the differential analog low-pass filter (F).

5. A servo system as claimed in claim 4, characterized in that the common mode control circuit is an operational transconductance amplifier ($T_7 \ldots T_{10}$) having an input for receiving a mean voltage of the two input terminals of the analog low-pass filter and a reference voltage ($V_R$) and whose output constitutes said current source ($i_{p+q}$) for supplying the sum of the first and second control signals.

6. A servo system as claimed in claim 2, characterized in that the analog low-pass filter comprises a first and a second single-ended integrator ($G_1$, $G_2$) for integrating the first and second control signals respectively, and an operational transconductance amplifier ($O_3$) having an input for receiving the mean voltage of the two output terminals of the analog low-pass filter ($G_1$, $G_2$) and a reference voltage ($V_{R2}$) and whose output constitutes said current source ($i_{p+q}$) for supplying the sum of the first and second control signals.

7. An apparatus comprising a servo system, characterized in that the servo system is a servo system as claimed in claim 1.

8. A sigma delta modulator for generating a digital representation of a quotient (P−Q)/(P+Q) between a difference (P−Q) and a sum (P+Q) of a first control (P) and a second control signal (Q) signal, characterized in that the sigma-delta-modulator is an analog sigma-delta-modulator (M) having an analog low-pass filter (F), a quantizer (E) receiving an output signal of the analog low-pass filter, a multiplying DA-converter (W) for converting and multiplying an output signal of the quantizer with the sum (P+Q) of the first and second control signals and means for supplying the difference (P−Q) of the first and second control signals and the output of the multiplying DA-converter (W) to an input of the analog low-pass filter (F).

9. A sigma delta modulator as claimed in claim 8, characterized in that the quantizer (E) is a 1 bit quantizer (E) and in that the multiplying DA-converter (W) comprises a current source ($i_{p+q}$) for supplying the sum of the first and second control signals and switch means ($W_1$, $W_2$) controlled by the output signal of the quantizer for switching said current source to the input of the low-pass filter (F).

10. A sigma delta modulator as claimed in claim 9, characterized in that the analog low-pass filter (F) is a differential analog low-pass filter with a first and a second input terminal to which the first and second control signals ($i_p$, $i_q$) respectively are applied.

11. A sigma delta modulator as claimed in claim 10, characterized by a common mode control circuit ($C_m$) for stabilizing the common mode voltage at the input of the differential analog low-pass filter (F).

12. A sigma delta modulator as claimed in claim 11, characterized in that the common mode control circuit is an operational transconductance amplifier ($T_7 \ldots T_{10}$) having an input for receiving a mean voltage provided at the first and second input terminals of the analog low-pass filter and a reference voltage ($V_R$) and whose output constitutes said current source ($i_{p+q}$) for supplying the sum of the first and second control signals.

13. A sigma delta modulator as claimed in claim 9, characterized in that the analog low-pass filter comprises a first and a second single-ended integrator ($G_1$, $G_2$) for integrating the first and second control signals respectively and an operational transconductance amplifier ($O_3$) having an input for receiving the mean voltage of the two output terminals of the analog low-pass filter ($G_1$, $G_2$) and a reference voltage ($V_{R2}$) and whose output constitutes said current source ($i_{p+q}$) for supplying the sum of the first and second control signals.

14. An integrated circuit comprising a sigma delta modulator as claimed in claim 8.

* * * * *